United States Patent [19]
Rauch et al.

[11] Patent Number: 5,408,355
[45] Date of Patent: Apr. 18, 1995

US005408355A

[54] MICROMECHANICAL TRANSDUCER

[75] Inventors: Manfred Rauch; Joachim Markert; Richard Kiehnscherf, all of Chemnitz, Germany

[73] Assignee: Labor Dr. Hans Steinbichler, Neubeuern, Germany

[21] Appl. No.: 969,799

[22] Filed: Oct. 30, 1992

[30] Foreign Application Priority Data

Oct. 30, 1991 [DE] Germany .................. 41 35 833.3
Sep. 4, 1992 [DE] Germany .................. 42 29 507.6

[51] Int. Cl.⁶ .................................. G02B 7/00
[52] U.S. Cl. ............................ 359/298; 359/291
[58] Field of Search ............ 73/861.043, 861.626, 73/861.624, 517 R, 517 B; 359/254, 290, 291, 846, 849

[56] References Cited

U.S. PATENT DOCUMENTS

| | | | |
|---|---|---|---|
| 3,096,656 | 7/1963 | Jackson | 73/517 R |
| 3,886,310 | 5/1975 | Guldberg et al. | 359/291 |
| 4,301,683 | 11/1981 | Hartmann et al. | 73/517 R |
| 4,345,474 | 8/1982 | Deval | 73/517 B |
| 4,615,595 | 10/1986 | Hornbeck | 359/291 |
| 4,710,732 | 12/1987 | Hornbeck | |
| 4,819,486 | 4/1989 | Kunkel et al. | 73/517 R |
| 4,954,789 | 9/1990 | Sampsell | |
| 5,083,857 | 1/1992 | Hornbeck | 359/846 |

FOREIGN PATENT DOCUMENTS

0477566 4/1992 European Pat. Off. .

OTHER PUBLICATIONS

European Search Report.

*Primary Examiner*—Herbert Goldstein
*Assistant Examiner*—R. Biegel
*Attorney, Agent, or Firm*—Morgan & Finnegan

[57] ABSTRACT

There is disclosed a micromechanical transducer having only one moving or movable part (1) and a stator (2), the part (1) being movable in relation to the stator and in the form of a flat member which is connected by spring arrangements, such as springs (6), to the stator. The movable part is capable of three-dimensional movement to implement a deflection.

33 Claims, 4 Drawing Sheets

MICROMECHANICAL TRANSDUCER

The present invention relates to a micromechanical transducer. More particularly, the invention relates to a micromechanical transducer having a moving or movable part which is preferably moved by electrostatic forces, preferably about three axes. The transducer can be utilized for the implementation of positioning tasks in the micrometer range, for instance, for the deflection or interruption of a beam.

BACKGROUND OF THE INVENTION

Arrangements for the positioning in one, two or three dimensions in the micrometer range have already been proposed in a multiplicity of different forms of micromechanical transducers. They can be employed for equipment and devices. It is possible to have a separate drive for each individual axis of movement. One- and two-dimensional positioning micromechanical transducer devices have also been proposed. The drives can be based on the utilization of electrostatic, electrodynamic, piezoelectric or other forces. Furthermore, it is possible to combine different forms of such drives with each other.

Prior German Patent Publications 2,531,069 A, 2,542,233 A and 2,557,814 B have proposed designs in which, for the two-dimensional deflection of a light beam, two moving mirrors are utilized and which mirrors are separately electromagnetically positioned.

In the case of devices proposed in German Patent Publication 2,321,211 B and European Patent Publication 0 154,870, mirrors are photoelectrically driven.

A device manufactured of etched crystalline or monocrystalline silicon is described in the European Patent Publication 0 040 302. This device consists of two mirrors which are only able to be moved about one axis, and which mirrors, in conjunction with a third mirror, are employed for two-dimensional displacement. A disadvantage of such an arrangement is the splitting of the beam deflection and the two-fold reflection of the beam, which can result in positioning errors.

A similar device is described in the European Patent Publication 005 970. In the case of this device, the mirrors, the spring elements and the frame constitute an integral material unit, which, in combination with two separate mirrors offset through 90°, cooperate with a further mirror so that a two-dimensional deflection is possible.

East German Patent Publication GO8C/338875 discloses a micromechanical moving device which consists of only one moving member and with which it is possible to produce two-dimensional deflections. An additional movement in a third dimension is only possible using a second element.

A direct three-dimensional effect on the beam is not possible with any of the above mentioned devices. In order to produce such a movement in the case of the known devices, at least two moving elements are necessary. The adjustment of the individual elements and the technology for the production of the same are correspondingly involved and rendered more complex.

BRIEF STATEMENT OF THE INVENTION

An object of the present invention is to provide a micromechanical transducer, more particularly in the form of a micromechanical three-dimensional transducer, which employs only one single moving or movable part but is capable of performing three-dimensional movements.

In accordance with the invention, this object is attained by a micromechanical transducer or, respectively, by a micromechanical three-dimensional transducer, characterized by a stator (2) and a part (1) movable in relation to the stator.

The micromechanical transducer in accordance with the invention is a micromechanical three-dimensional transducer which utilizes a single moving or movable part and is capable of performing a three-dimensional movement or deflection. Due to the use of crystalline, and more particularly monocrystalline silicon, and modern micromechanical methods of production, the transducer of this invention can be speedily and conveniently produced. Since the transducer comprises only one moving or movable part, the technology of manufacture is relatively simple.

The moving part is preferably manufactured in the form of a flat or sheet-like part.

The moving part is may have at least one beam or ray reflecting surface on the side facing away from the stator and preferably has a cruciform or a stellate configuration.

The side of the moving or movable part facing away from the stator can be metallized. The side of the moving or movable part facing the stator is preferably metallized over its entire surface.

A further advantageous feature of the micromechanical transducer of the invention resides in the fact that the side of the moving or movable part is metallized in a cruciform or a stellate configuration.

The above mentioned features can be combined with each other. It is, for instance, possible to so design the moving or movable part so that it has a cruciform or a stellate configuration and the side of the moving or movable part facing the stator can be metallized over its entire surface area with the result that the side of the moving or movable part facing the stator is metallized in a cruciform or a stellate configuration.

In accordance with a further advantageous feature of the invention the moving or movable part and/or the stator may be provided with controllably energized electrodes so that the moving or movable part can be moved by electrostatic forces. It is particularly advantageous to provide the stator with controllably energized electrodes.

The electrodes may be arranged in a circular area. They may furthermore be divided into sectors and/or segments. It is also advantageous to arrange the electrodes in a symmetrical configuration.

The electrodes are preferably able to be selectively energized.

The moving or movable part can be connected with the stator by springs or arrangements of springs. The springs preferably extend in the plane of the moving or movable part or, respectively, moving or movable flat part. The springs may be flat or strip springs. In accordance with an advantageous embodiment of the invention four springs which are preferably arranged at an angle of 90° to each other are provided.

A further advantageous feature of the invention is that the springs have the same restoring forces and/or the same restoring moments in three directional components, such three directional components preferably extending perpendicularly to each other.

The springs can also be in the form of meandering structures.

In keeping with yet another possible form of the invention, the distance between the moving or movable part and the stator can be modified, that is, is adjustable.

The moving or movable part may be supported in relation to the stator by means of a spherical surface. Such spherical surface may be on a sphere and then the moving flat or sheet-like part is journaled in relation to the stator using a sphere. The spherical surface may, however, also be a cylinder provided with a segment of a sphere and in such case the moving or movable part is journaled by the cylinder with the spherical segment in relation to the stator. The cylinder may, in accordance with another advantageous form of the invention, be able to be moved in relation to the stator.

It is an advantage if the moving or movable part has openings. The openings in the moving or movable part may be in alignment with openings in the stator.

THE DRAWINGS

Further advantageous developments and convenient forms of the invention will be understood from the following detailed description of one embodiment of the invention which is to be taken in conjunction with the accompanying Drawings in which.

DESCRIPTION OF THE PREFERRED EMBODIMENTS

Figure 1:
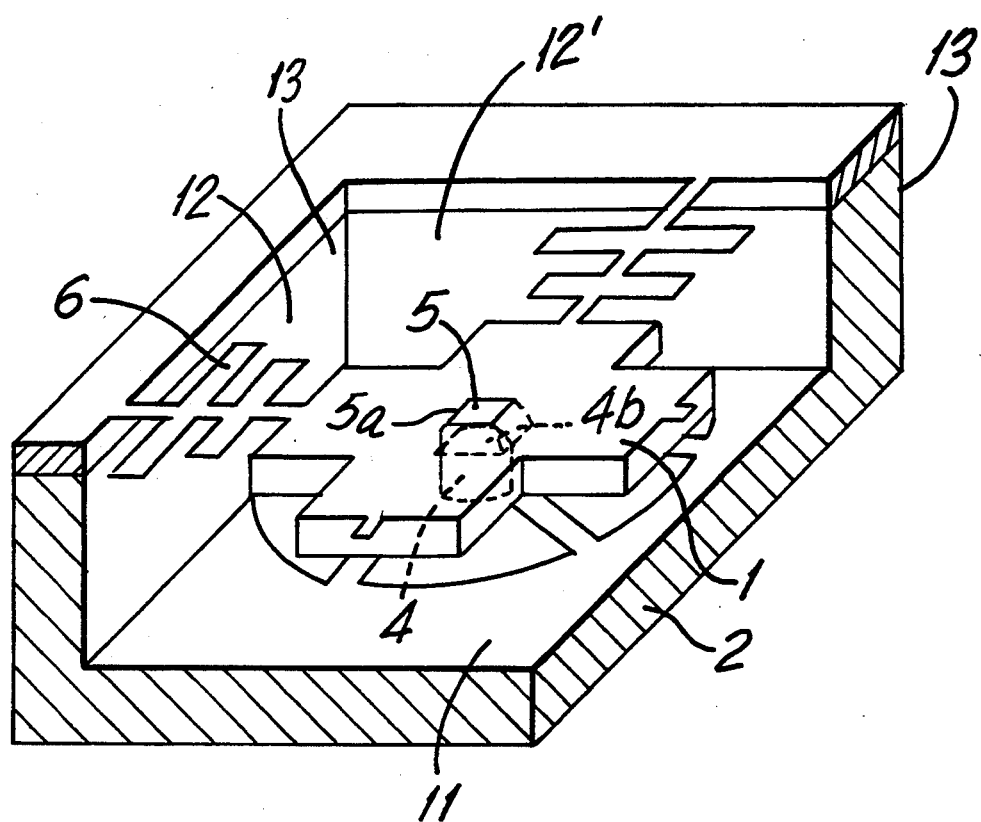
FIG. 1 shows a micromechanical three-dimensional transducer according to the invention in a perspective view.

The general structure of the micromechanical three-dimensional transducer according to the invention will be clear from FIG. 1. It consists of a stator 2, which in FIG. 1 is shown partly sectioned. The stator 2 consists of a horizontal, even base surface 11 and four vertical lateral walls of which in FIG. 1 only two, 12 and 12′ are illustrated in order to render the Drawing more straightforward. Over the base surface 11 of the stator a moving or movable part 1 is arranged, which is in the form of flat or sheet-like member. In the basic or neutral position the flat member, that is, the moving or movable part, is located at a distance from the base surface 11 of the stator 2. It extends in parallel disposition to the base surface 11, substantially in the plane of the top ends of the lateral walls.

The illustrated flat moving or movable part 1 has a geometry of a cross. It is centrally, that is to say in its middle part, supported over the stator 2 by means of a cylinder 4 provided with a spherical segment 4b in the frustum 5a of a hollow pyramid 5.

Between the flat moving or movable part 1 and the controllably energized electrodes, such as electrode 3, which are provided on the base surface 11 of the stator 2, electrostatic forces are established. Due to the geometry of the flat moving or movable part 1, which, on the side facing the stator 2, is metallized over its entire area, and the configuration of the electrodes on the base surface 11 of the stator (2) electrostatic forces are produced which are responsible for three-dimensional movement or motion of the flat moving or movable part 1.

The flat part 1 is held by means of special spring arrangements 6 over the stator 2 or, respectively, the base surface 11 thereof. After a deflection by the springs 6, the flat part 1 is moved back into the starting position illustrated in FIG. 1. Owing to their geometry, the spring arrangements 6 ensure identical restoring forces in all three directions. The spring arrangements are designed so that the restoring forces are, respectively, equal in all three spatial dimensions or directions (perpendicular to the base surface 11 of the stator 2 and perpendicular to the lateral walls of the stator 2).

The distance between the flat moving or movable part 1 and the stator 2 or, respectively, its base surface 11, is predetermined by the arrangement of the cylinder 4 with the spherical segment 4b in the hollow pyramid frustum 5a. This setting is made in accordance with the size of the hollow pyramid frustum 5a as related to the diameter opposition spherical segment 4b, (see also FIG. 4).

The top side of the moving flat part 1 is metallized to provide one or more beam reflecting surfaces which possess a high degree of reflection in order, for instance, to produce deflection of a laser beam. The flat part 1 and/or the stator 2 may have openings of any desired geometry and in any desired number, which correspond to each other and cause an interruption of the incident beam owing to rotation of the flat part 1 in relation to the stator 2.

The moving flat part 1 with the spring arrangements 6 and the stator 2 can be produced using simple manufacturing technology from a single part. A separation thereof to form two parts is, however, also possible, for example, as the flat part 1 and the spring arrangements 6 with the frame 13, that is, the upper end of the lateral walls of the stator 2, on the one hand, and the stator 2 on the other hand. In this regard, it is to be noted that the frame 13 constitutes the upper end of the lateral walls of the stator 2. The two parts, or in other words, the flat part 1 with the spring arrangements and the frame, on the one hand, and the stator 2, on the other hand, have to be adjusted in relation to each other and secured together.

Figure 2A:
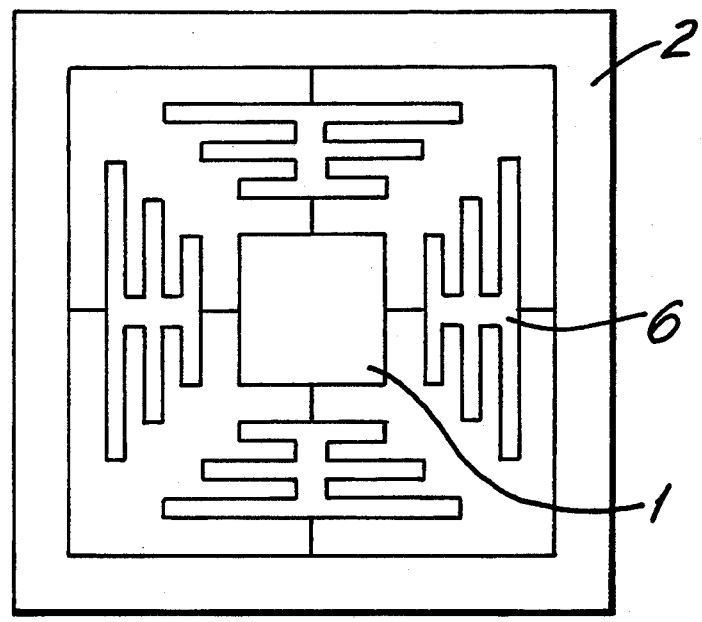
FIG. 2a shows a spring arrangement.
Figure 2B:
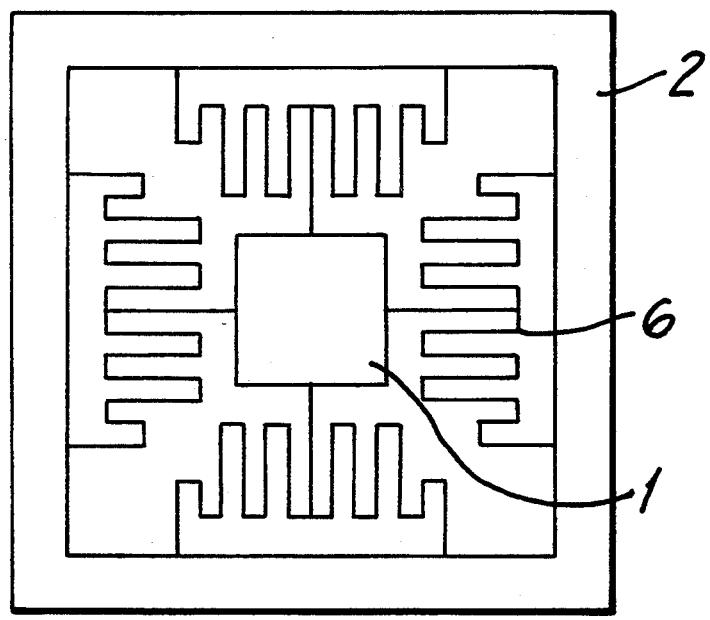
FIG. 2b shows a modification of the spring arrangement.
Figure 2C:
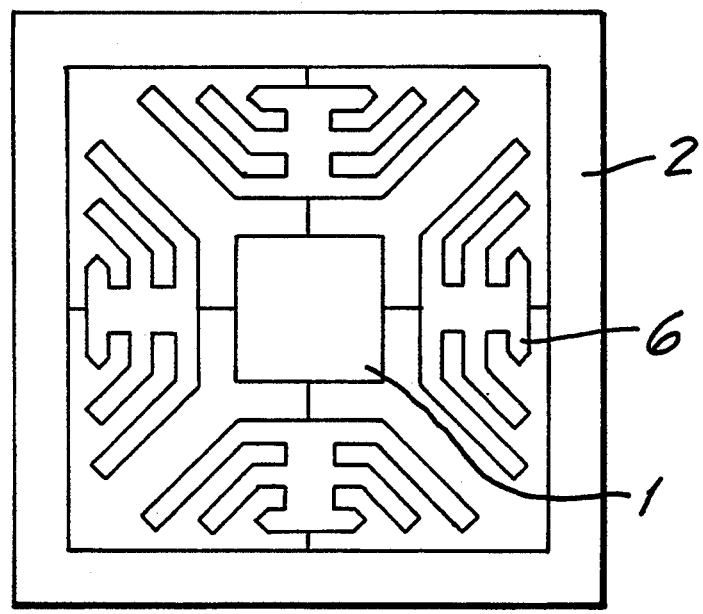
FIG. 2c is a view of a modification of the spring arrangement.

FIGS. 2a, 2b and 2c show special meandering spring arrangements 6 which, owing to their geometrical configuration, have the same restoring forces in all directions. The springs 6 are secured on the one side on the flat moving or movable part 1 and, on the other side, on the stator 2 or, respectively, on frame 13.

The springs 6 of FIG. 2a extend in a meandering manner from the stator 2 or, respectively, the frame 13 to the flat moving or movable part 1. The length of the rectangles constituting the meandering configuration increases from the stator 2 towards the flat part 1, that is to say from the outside to the inside. Furthermore, the springs are symmetrical with respect to a line extending outwards from the center of the flat part 1.

In the case of the design depicted in FIG. 2b, the meanderings of the springs 6 extend in parallel disposition on each respective side of the stator 2 or, respectively, of the frame 13. The rectangles constituting meanderings are made smaller in size. Furthermore, the springs 6, in accordance with FIG. 2b, are symmetrical with respect to a line extending from the center of the flat part 1 to the middle of the associated lateral surface of the stator 2.

FIG. 2c shows a modification of the spring arrangements 6 illustrated in FIG. 2a. In this case, the outer rectangles, that is to say those nearer the stator 2, of the meanderings are shorter than the inner ones, that is to say, those near the flat part 1. The length of the rectangles consequently increases from the inside towards the outside. Furthermore, the rectangles—apart from the outermost rectangle which is nearest to the stator 2—are cranked at an angle of approximately 45°. Moreover, the springs 6 illustrated in FIG. 2c are symmetrical with respect to a line extending from the center of the flat part 1 to the middle of the associated side of the stator 2.

Figure 3:
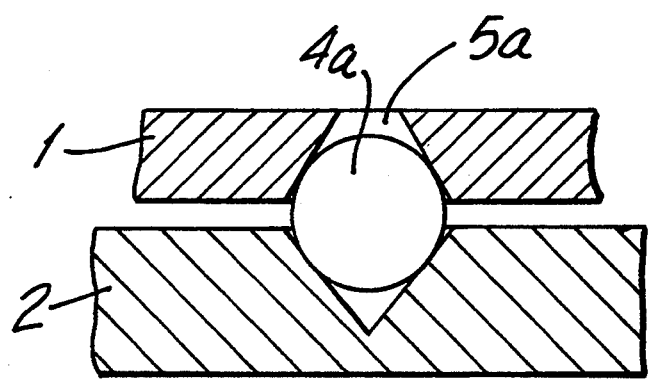
FIG. 3 shows bearing means for the moving or movable part in the form of a flat member, using a sphere.

FIG. 3 shows the bearing means for the flat moving or movable part 1 using a sphere 4a in a hollow pyramid 5 of the stator 2 or, respectively, of the base surface 11 of the stator 2 and in the frustum 5a of a hollow pyramid 5 in the flat part 1. The positions of bearing in the flat part 1 and in the stator 2 can be designed in the form of hollow pyramids 5 or in the form of a frustum 5a of such a hollow pyramid. The distance between the flat part 1 and the stator 2 can be set by changing the ratio between the diameter of the sphere and the size of the pyramid.

Figure 4:
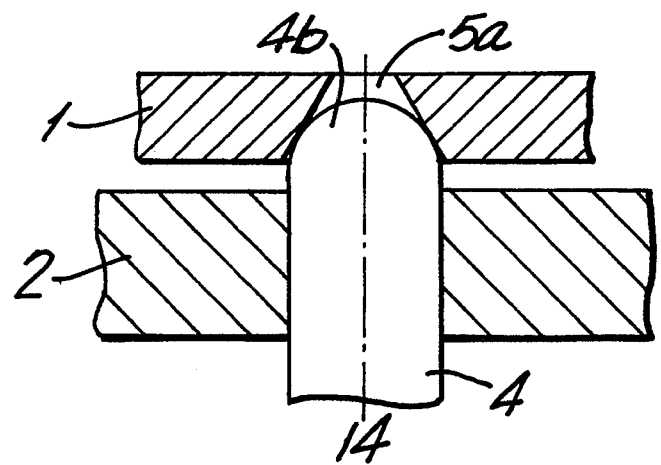
FIG. 4 shows bearing means for the moving or movable part in the form of a flat member, using a spherical segment.

FIG. 4 shows another form of the bearing arrangement for the flat moving or movable part 1 in relation to the stator 2 or, respectively, the base surface 11 thereof. A cylinder 4, which is arranged in the stator 2 and which extends through the base surface 11 of the stator 2, has a spherical segment 4b at its upper end. The flat part 1 is supported owing to the contact between the inner surface of the hollow frustum 5a or a pyramid on the surface of the spherical segment 4b. The distance between the flat part 1 and the stator 2 may, on the one hand,—as in FIG. 3—be set by selection of the ratio between the diameter of the sphere segment 4b and the size of the frustum 5a of the hollow pyramid. Furthermore, on the other hand, a selection is possible by displacement of the cylinder 4 along its longitudinal axis 14 in the stator 2.

Figure 5A:
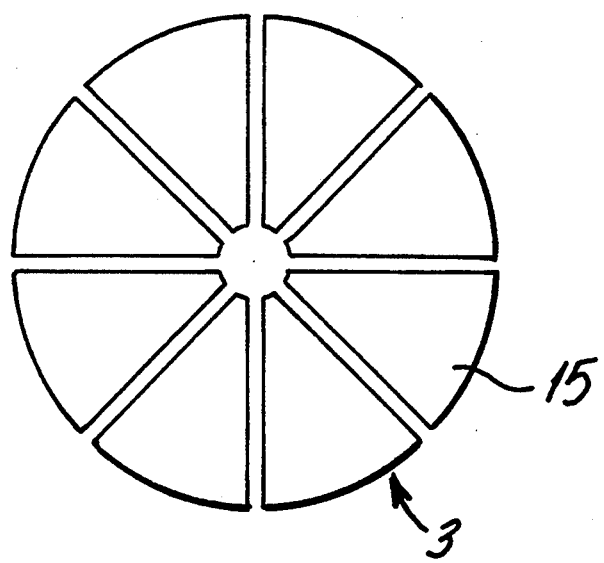
FIG. 5a shows an electrode arrangement in which the electrodes are arranged in sectors.

FIG. 5a shows an electrode 3 in an arrangement which consists of a multiplicity of sectors, such as sector 15. The electrode 3 is arranged in the manner indicated in FIG. 1 on the base surface 11 of the stator 2. Owing to the cooperation between the cruciform or cross-like flat, moving or movable part 1, in accordance with FIG. 1, or with a stellate flat part 1, it is possible to produce electrostatic forces, when the electrodes 3 or, respectively, the sectors, such as sector 15, of the electrode 3 are controllably energized. An identical force effect can be produced using an electrode arrangement on the side facing the stator 2 of the flat part 1, which arrangement corresponds to the electrodes 3 on the stator 2.

Figure 5B:
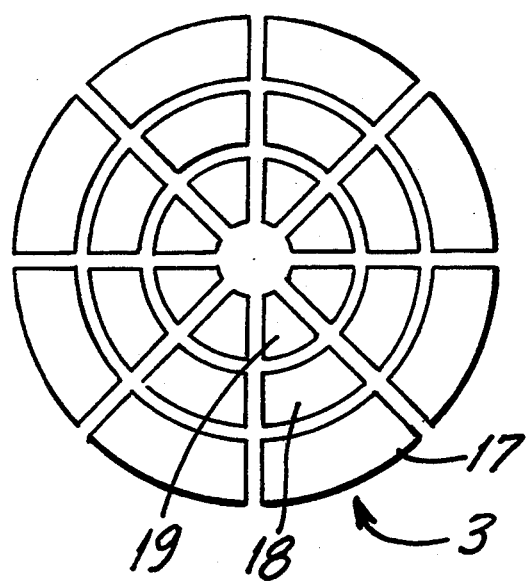
FIG. 5b shows an electrode arrangement in which the electrodes are arranged in sectors and in segments.

In the manner indicated in FIG. 5b, it is possible for the sectors, such as sector 15, to be divided up into individual segments, such as segments 17, 18 and 19. Thus, it is possible to have a pseudo-digital controlled energization of the flat part 1.

Due to the electrostatic forces between the flat, moving or movable part 1 and the stator 2 there will be change in the setting of the flat part 1, which will be responsible for a tilting motion in two dimensions and/or a rotary movement. Ultimately, it is, therefore, possible for the flat part 1 to be moved in all three dimensions. The change in the setting or attitude of the flat part 1 leads to a change in capacitance between the flat part 1 and the stator 2, which is measured and for its part supplied to a system, such as a regulation system.

The electrodes, such as electrode 3, and, respectively, sectors, such as sector 15, and segments, such as segments 17, 18 and 19, present on the stator 2 or, respectively, its base surface 11, can be energized selectively. In the embodiments of the invention depicted in FIGS. 1, 5a and 5b, the electrodes are arranged in a circular area. They are, moreover, arranged in a symmetrical configuration.

The springs 6 extend in the same plane as the moving or movable flat part 1. They are designed as flat or strip springs. In the embodiment of the invention depicted in FIG. 1, four springs are provided, which have an angular spacing of, respectively, 90° from each other.

What is claimed is:

1. A micromechanical transducer capable of performing three-dimensional movement comprising a movable part (1) and a·stator (2), said movable part (1) being supported in relation to said stator (2) by a spherical segment (4a,4b) and provided with a plurality of spring arrangements (6) attached to said stator (2), said movable part (1) being held over said stator (2) by said spherical segment (4a,4b); said spherical segment (4a,4b) supporting said movable part (1) in a plane in spaced parallel disposition with respect to said stator (2); and both said movable part (1) and said stator (2) having controllably energized electrodes (3) located thereon, whereby energization of said controllably energized electrodes (3) establishes electrostatic forces between said movable part (1) and said controllably energized electrodes (3) which forces impart three-dimensional movement to said movable part (1).

2. The micromechanical transducer according to claim 1 wherein the movable part (1) is a flat part.

3. The micromechanical transducer according to claim 1 wherein the movable part (1) has at least one beam reflecting surface on a side facing the stator (2).

4. The micromechanical transducer according to claim 1 wherein the movable part (1) has a cruciform configuration.

5. The micromechanical transducer according to claim 1 wherein the side of the movable part (1) facing the stator (2) is metallized.

6. The micromechanical transducer according to claim 1 wherein the controllably energized electrodes are arranged in a circular area.

7. The micromechanical transducer according to claim 1 wherein the controllably energized electrodes (3) are divided into sectors (15).

8. The micromechanical transducer according to claim 1 wherein the controllably energized electrodes (3) are divided into segments (16).

9. The micromechanical transducer according to claim 1 wherein the electrodes (3) are arranged in a symmetrical configuration.

10. The micromechanical transducer according to claim 1 wherein the movable part (1) is connected to the stator (2) by springs (6).

11. The micromechanical transducer according to claim 10 wherein the springs (6) extend in the same plane as the movable part (1).

12. The micromechanical transducer according to claim 10 wherein the springs (6) are flat springs.

13. The micromechanical transducer according to claim 10 employing four springs set at an angle of 90° with respect to each other.

14. The micromechanical transducer according to claim 10 wherein the springs (6) have the same restoring force in three directional components and said three dimensional components extend perpendicularly to each other.

15. The micromechanical transducer according to claim 10 wherein the springs (6) have a meandering configuration.

16. The micromechanical transducer according to claim 1 wherein the distance between the movable part (1) and the stator (2) is adjustable.

17. The micromechanical transducer according to claim 1 wherein the movable part (1) is supported by a spherical surface (4a and 4b) in relation to the stator.

18. The micromechanical transducer according to claim 1 wherein the movable part 1 is a flat part and is supported by a sphere (4a) in relation to the stator (2).

19. The micromechanical transducer according to claim 17 wherein the movable part (1) is supported by a cylinder (4) provided with a spherical segment (4b) in relation to the stator 2.

20. The micromechanical transducer according to claim 19 wherein the cylinder (4) together with the spherical segment (4b) is movable in relation to the stator (2).

21. The micromechanical transducer according to claim 1 wherein the movable part (1) is provided with openings.

22. The micromechanical transducer according to claim 21 wherein the openings in the movable part (1) are aligned with openings provided in the stator (2).

23. The micromechanical transducer according to claim 1 wherein only the movable part (1) has controllably energized electrodes (3) located thereon.

24. The micromechanical transducer according to claim 23 wherein the controllably energized electrodes (3) are arranged in a circular area.

25. The micromechanical transducer according to claim 23 wherein the controllably energized electrodes (3) are divided into sectors (15).

26. The micromechanical transducer according to claim 23 wherein the controllably energized electrodes (3) are divided into segments (16).

27. The micromechanical transducer according to claim 23 wherein the electrodes (3) are arranged in a symmetrical configuration.

28. The micro mechanical transducer according to claim 1 wherein only the stator (2) has controllably energized electrodes (3) located thereon.

29. The micromechanical transducer according to claim 28 wherein the controllable energized electrodes (3) are arranged in a circular area.

30. The micromechanical transducer according to claim 28 wherein the controllably energized electrodes (3) are divided into sectors (15).

31. The micromechanical transducer according to claim 28 wherein the controllably energized electrodes (3) are divided into segments (16).

32. The micromechanical transducer according to claim 28 wherein the electrodes (3) are arranged in a symmetrical configuration.

33. The micromechanical transducer according to claim 1 wherein the movable part (1) has a stellate configuration.

* * * * *